United States Patent
Mattern et al.

(10) Patent No.: US 10,604,184 B2
(45) Date of Patent: Mar. 31, 2020

(54) ADAPTIVE STEERING CONTROL FOR ROBUSTNESS TO ERRORS IN ESTIMATED OR USER-SUPPLIED TRAILER PARAMETERS

(71) Applicant: Ford Global Technologies, LLC, Dearborn, MI (US)

(72) Inventors: Donald Jacob Mattern, Canton, MI (US); Brian George Buss, Ypsilanti, MI (US); Joseph M. Raad, Farmington, MI (US); Tyler Daavettila, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/692,569

(22) Filed: Aug. 31, 2017

(65) Prior Publication Data
US 2019/0061817 A1    Feb. 28, 2019

(51) Int. Cl.
*B62D 15/02* (2006.01)
*B62D 6/00* (2006.01)
*B62D 13/06* (2006.01)

(52) U.S. Cl.
CPC .......... *B62D 15/025* (2013.01); *B62D 6/002* (2013.01); *B62D 13/06* (2013.01); *B62D 15/0285* (2013.01)

(58) Field of Classification Search
CPC ...... B62D 6/002; B62D 6/003; B62D 15/027; B62D 15/025; B62D 13/06; B62D 15/0285
See application file for complete search history.

(56) References Cited

U.S. PATENT DOCUMENTS

| | | |
|---|---|---|
| 3,542,390 A | 11/1970 | Fikse |
| 3,756,624 A | 9/1973 | Taylor |
| 3,860,257 A | 1/1975 | Mesly |
| 4,042,132 A | 8/1977 | Bohman et al. |
| 4,735,432 A | 4/1988 | Brown |
| 4,752,080 A | 6/1988 | Rogers |
| 4,848,499 A | 7/1989 | Martinet et al. |

(Continued)

FOREIGN PATENT DOCUMENTS

| | | |
|---|---|---|
| CN | 202159367 U | 3/2012 |
| DE | 3931518 A1 | 4/1991 |

(Continued)

OTHER PUBLICATIONS

Haviland, G S, "Automatic Brake Control for Trucks—What Good Is It?", TRID, Society of Automotive Engineers, Sep. 1968, 1 pg.

(Continued)

*Primary Examiner* — Hunter B Lonsberry
*Assistant Examiner* — Luis A Martinez Borrero
(74) *Attorney, Agent, or Firm* — Raymond Coppiellie; Price Heneveld LLP

(57) ABSTRACT

A system for assisting in reversing of a vehicle-trailer combination includes a vehicle steering system and a controller. The controller outputs a steering signal based on a control parameter to the steering system to maintain the trailer along a commanded backing path, determines an error between a measured behavior of a characteristic of the vehicle-trailer combination and a predicted behavior of the characteristic, and adjusts the control parameter based on the error.

16 Claims, 10 Drawing Sheets

(56) References Cited

U.S. PATENT DOCUMENTS

| | | | |
|---|---|---|---|
| 5,001,639 | A | 3/1991 | Breen |
| 5,108,158 | A | 4/1992 | Breen |
| 5,246,242 | A | 9/1993 | Penzotti |
| 5,247,442 | A | 9/1993 | Kendall |
| 5,558,350 | A | 9/1996 | Kimbrough et al. |
| 5,586,814 | A | 12/1996 | Steiner |
| 6,042,196 | A | 3/2000 | Nakamura et al. |
| 6,056,371 | A | 5/2000 | Lin et al. |
| 6,155,377 | A * | 12/2000 | Tokunaga ............ B62D 1/166 180/446 |
| 6,292,094 | B1 | 9/2001 | Deng et al. |
| 6,301,532 | B1 * | 10/2001 | Kull ................ B62D 15/0245 701/301 |
| 6,351,698 | B1 | 2/2002 | Kubota et al. |
| 6,389,342 | B1 | 5/2002 | Kanda |
| 6,409,288 | B2 | 6/2002 | Yoshida et al. |
| 6,494,476 | B2 | 12/2002 | Masters et al. |
| 6,498,977 | B2 | 12/2002 | Wetzel et al. |
| 6,567,731 | B2 | 5/2003 | Chandy |
| 6,704,653 | B2 * | 3/2004 | Kuriya ............... B62D 15/0275 340/425.5 |
| 6,765,607 | B2 * | 7/2004 | Mizusawa ................ B60D 1/36 348/118 |
| 6,838,979 | B2 | 1/2005 | Deng et al. |
| 6,854,557 | B1 | 2/2005 | Deng et al. |
| 7,032,705 | B2 | 4/2006 | Zheng et al. |
| 7,117,077 | B2 | 10/2006 | Michi et al. |
| 7,136,754 | B2 | 11/2006 | Hahn et al. |
| 7,139,650 | B2 | 11/2006 | Lubischer |
| 7,154,385 | B2 | 12/2006 | Lee et al. |
| 7,165,820 | B2 | 1/2007 | Rudd, III |
| 7,219,913 | B2 | 5/2007 | Atley |
| 7,319,927 | B1 | 1/2008 | Sun et al. |
| 7,546,191 | B2 | 6/2009 | Lin et al. |
| 7,690,737 | B2 | 4/2010 | Lu |
| 7,706,944 | B2 | 4/2010 | Tanaka et al. |
| 7,715,953 | B2 | 5/2010 | Shepard |
| 7,757,608 | B2 * | 7/2010 | Kono .................. B62D 1/265 104/88.01 |
| 7,793,965 | B2 | 9/2010 | Padula |
| 7,969,326 | B2 | 6/2011 | Sakakibara |
| 8,010,253 | B2 | 8/2011 | Lundquist |
| 8,033,955 | B2 | 10/2011 | Farnsworth |
| 8,036,792 | B2 | 10/2011 | Dechamp |
| 8,108,116 | B2 | 1/2012 | Mori et al. |
| 8,139,109 | B2 | 3/2012 | Schmiedel et al. |
| 8,170,726 | B2 | 5/2012 | Chen et al. |
| 8,244,442 | B2 | 8/2012 | Craig et al. |
| 8,260,518 | B2 | 9/2012 | Englert |
| 8,267,485 | B2 | 9/2012 | Barlsen et al. |
| 8,280,607 | B2 | 10/2012 | Gatti et al. |
| 8,374,749 | B2 | 2/2013 | Tanaka |
| 8,430,792 | B2 | 4/2013 | Noll |
| 8,469,125 | B2 | 6/2013 | Yu et al. |
| 8,571,758 | B2 | 10/2013 | Klier et al. |
| 8,755,982 | B2 | 6/2014 | Heckel et al. |
| 8,755,984 | B2 | 6/2014 | Rupp et al. |
| 8,798,860 | B2 | 8/2014 | Dechamp |
| 8,825,262 | B2 * | 9/2014 | Lee ................... B62D 15/0285 701/25 |
| 8,909,426 | B2 | 12/2014 | Rhode et al. |
| 8,930,140 | B2 | 1/2015 | Trombley et al. |
| 9,102,271 | B2 | 8/2015 | Trombley et al. |
| 9,108,598 | B2 | 8/2015 | Headley |
| 9,132,856 | B2 | 9/2015 | Shepard |
| 9,156,496 | B2 | 10/2015 | Greenwood et al. |
| 9,164,955 | B2 | 10/2015 | Lavoie et al. |
| 9,180,890 | B2 | 11/2015 | Lu et al. |
| 9,227,474 | B2 * | 1/2016 | Liu ........................ B60D 1/245 |
| 9,229,453 | B1 | 1/2016 | Lee |
| 9,238,483 | B2 | 1/2016 | Hafner et al. |
| 9,248,858 | B2 | 2/2016 | Lavoie et al. |
| 9,315,212 | B1 | 4/2016 | Kyrtsos et al. |
| 9,335,162 | B2 | 5/2016 | Kyrtsos et al. |
| 9,340,228 | B2 | 5/2016 | Xu et al. |
| 9,434,414 | B2 * | 9/2016 | Lavoie .................. B62D 13/06 |
| 9,464,913 | B2 * | 10/2016 | Brown .............. G01C 21/3629 |
| 9,500,497 | B2 | 11/2016 | Lavoie et al. |
| 9,616,923 | B2 | 4/2017 | Lavoie et al. |
| 9,840,278 | B2 | 12/2017 | Lavoie et al. |
| 10,353,393 | B2 * | 7/2019 | Zhu ........................ B62D 6/001 |
| 10,427,716 | B2 * | 10/2019 | Xu ........................ B62D 15/029 |
| 2001/0037164 | A1 | 11/2001 | Hecker |
| 2001/0052434 | A1 | 12/2001 | Ehrlich et al. |
| 2004/0222881 | A1 | 11/2004 | Deng et al. |
| 2005/0165546 | A1 * | 7/2005 | Aral ...................... G01C 21/20 701/50 |
| 2005/0206224 | A1 | 9/2005 | Lu |
| 2005/0206225 | A1 | 9/2005 | Offerle et al. |
| 2005/0206229 | A1 | 9/2005 | Lu et al. |
| 2005/0236201 | A1 | 10/2005 | Spannheimer et al. |
| 2005/0236896 | A1 | 10/2005 | Offerle et al. |
| 2006/0103511 | A1 | 5/2006 | Lee et al. |
| 2006/0142936 | A1 | 6/2006 | Dix |
| 2006/0167600 | A1 * | 7/2006 | Nelson, Jr. ........... A01B 69/008 701/23 |
| 2006/0200280 | A1 * | 9/2006 | Kono ...................... B62D 1/265 701/19 |
| 2007/0027581 | A1 | 2/2007 | Bauer et al. |
| 2007/0198190 | A1 | 8/2007 | Bauer et al. |
| 2008/0177443 | A1 | 7/2008 | Lee et al. |
| 2008/0231701 | A1 | 9/2008 | Greenwood et al. |
| 2009/0082935 | A1 | 3/2009 | Leschuk et al. |
| 2009/0157260 | A1 | 6/2009 | Lee |
| 2009/0198425 | A1 | 8/2009 | Englert |
| 2009/0271078 | A1 | 10/2009 | Dickinson |
| 2009/0306854 | A1 | 12/2009 | Dechamp |
| 2009/0306861 | A1 | 12/2009 | Schumann et al. |
| 2009/0326775 | A1 | 12/2009 | Nishida |
| 2010/0152989 | A1 | 6/2010 | Smith et al. |
| 2011/0087398 | A1 | 4/2011 | Lu et al. |
| 2011/0118938 | A1 * | 5/2011 | MacDonald ......... A01B 69/008 701/41 |
| 2012/0041658 | A1 | 2/2012 | Turner |
| 2012/0095649 | A1 | 4/2012 | Klier et al. |
| 2012/0200706 | A1 | 8/2012 | Greenwood et al. |
| 2012/0271512 | A1 | 10/2012 | Rupp et al. |
| 2012/0271514 | A1 | 10/2012 | Lavoie et al. |
| 2012/0271515 | A1 | 10/2012 | Rhode et al. |
| 2012/0271522 | A1 | 10/2012 | Rupp et al. |
| 2012/0283909 | A1 | 11/2012 | Dix |
| 2012/0310594 | A1 | 12/2012 | Watanabe |
| 2012/0316732 | A1 | 12/2012 | Auer |
| 2013/0148748 | A1 | 6/2013 | Suda |
| 2013/0179038 | A1 | 7/2013 | Goswami et al. |
| 2013/0268160 | A1 | 10/2013 | Trombley et al. |
| 2014/0052337 | A1 | 2/2014 | Lavoie et al. |
| 2014/0058614 | A1 | 2/2014 | Trombley et al. |
| 2014/0058622 | A1 | 2/2014 | Trombley et al. |
| 2014/0058655 | A1 | 2/2014 | Trombley et al. |
| 2014/0058668 | A1 | 2/2014 | Trombley et al. |
| 2014/0067154 | A1 | 3/2014 | Yu et al. |
| 2014/0067155 | A1 | 3/2014 | Yu et al. |
| 2014/0085472 | A1 | 3/2014 | Lu et al. |
| 2014/0121930 | A1 | 5/2014 | Allexi et al. |
| 2014/0160276 | A1 | 6/2014 | Pliefke et al. |
| 2014/0172232 | A1 | 6/2014 | Rupp et al. |
| 2014/0188344 | A1 | 7/2014 | Lavoie |
| 2014/0188346 | A1 | 7/2014 | Lavoie |
| 2014/0210456 | A1 | 7/2014 | Crossman |
| 2014/0218506 | A1 | 8/2014 | Trombley et al. |
| 2014/0218522 | A1 | 8/2014 | Lavoie et al. |
| 2014/0222288 | A1 | 8/2014 | Lavoie et al. |
| 2014/0236532 | A1 | 8/2014 | Trombley et al. |
| 2014/0249691 | A1 * | 9/2014 | Hafner ................... B62D 13/06 701/1 |
| 2014/0249723 | A1 | 9/2014 | Pilutti et al. |
| 2014/0267688 | A1 | 9/2014 | Aich et al. |
| 2014/0267689 | A1 | 9/2014 | Lavoie |
| 2014/0277942 | A1 | 9/2014 | Kyrtsos et al. |
| 2014/0297128 | A1 | 10/2014 | Lavoie et al. |
| 2014/0297129 | A1 | 10/2014 | Lavoie et al. |
| 2014/0303847 | A1 | 10/2014 | Lavoie |

(56) References Cited

U.S. PATENT DOCUMENTS

| | | | |
|---|---|---|---|
| 2014/0303849 A1* | 10/2014 | Hafner | B60D 1/245 |
| | | | 701/42 |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0358429 A1 | 12/2014 | Shutko et al. | |
| 2014/0379217 A1 | 12/2014 | Rupp et al. | |
| 2015/0025732 A1 | 1/2015 | Min et al. | |
| 2015/0057903 A1 | 2/2015 | Rhode et al. | |
| 2015/0066296 A1 | 3/2015 | Trombley et al. | |
| 2015/0066298 A1 | 3/2015 | Sharma et al. | |
| 2015/0120141 A1 | 4/2015 | Lavoie et al. | |
| 2015/0134183 A1 | 5/2015 | Lavoie et al. | |
| 2015/0138340 A1 | 5/2015 | Lavoie | |
| 2015/0158527 A1* | 6/2015 | Hafner | B60D 1/62 |
| | | | 701/41 |
| 2015/0203156 A1* | 7/2015 | Hafner | B62D 13/06 |
| | | | 701/36 |
| 2015/0210317 A1 | 7/2015 | Hafner et al. | |
| 2015/0217693 A1 | 8/2015 | Pliefke et al. | |
| 2015/0232092 A1 | 8/2015 | Fairgrieve et al. | |
| 2016/0001705 A1 | 1/2016 | Greenwood et al. | |
| 2016/0009288 A1 | 1/2016 | Yu | |
| 2016/0039456 A1 | 2/2016 | Lavoie et al. | |
| 2016/0052548 A1 | 2/2016 | Singh et al. | |
| 2016/0059888 A1 | 3/2016 | Bradley et al. | |
| 2016/0129939 A1 | 5/2016 | Singh et al. | |
| 2016/0229452 A1* | 8/2016 | Lavoie | B62D 15/027 |
| 2017/0101130 A1* | 4/2017 | Lavoie | B62D 13/06 |
| 2017/0106869 A1* | 4/2017 | Lavoie | B60T 8/1708 |
| 2017/0144701 A1* | 5/2017 | Medagoda | B62D 6/00 |
| 2017/0158236 A1* | 6/2017 | Kim | B60R 1/00 |
| 2017/0259850 A1 | 9/2017 | Yamashita et al. | |
| 2017/0313351 A1 | 11/2017 | Lavoie | |
| 2018/0111621 A1* | 4/2018 | Buss | B62D 13/06 |
| 2018/0188734 A1* | 7/2018 | Zhu | B60W 30/095 |
| 2018/0215382 A1* | 8/2018 | Gupta | G08G 1/165 |
| 2019/0077457 A1* | 3/2019 | Xu | B60D 1/06 |
| 2019/0092388 A1* | 3/2019 | Raad | B62D 13/005 |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |
| WO | 2015187467 A1 | 12/2015 |

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

* cited by examiner

ADAPTIVE STEERING CONTROL FOR ROBUSTNESS TO ERRORS IN ESTIMATED OR USER-SUPPLIED TRAILER PARAMETERS

FIELD OF THE DISCLOSURE

The present disclosure generally relates to steering assist technologies in vehicles and, more particularly, to a trailer backup assist system compensating for an error by scaling a control factor of the system.

BACKGROUND OF THE DISCLOSURE

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified, thereby causing the trailer to depart from a desired path.

Therefore, an approach for backing a trailer that provides a simple human machine interface and that overcomes other shortcomings of known trailer backup assist systems may be advantageous, desirable or useful.

SUMMARY OF THE DISCLOSURE

According to one aspect of the present disclosure, a system for assisting in reversing of a vehicle-trailer combination includes a vehicle steering system and a controller. The controller outputs a steering signal based on a control parameter to the steering system to maintain the trailer along a commanded backing path, determines an error between a measured behavior of a characteristic of the vehicle-trailer combination and a predicted behavior of the characteristic, and adjusts the control parameter based on the error.

Embodiments of the first aspect of the invention can include any one or a combination of the following features:
  the steering signal is further based on a plurality of kinematic parameters in a vehicle-trailer model and adjusting the control parameter based on the error compensates for an inaccuracy in one or more of the kinematic parameters;
  the predicted behavior of the characteristic is further based on the plurality of kinematic parameters in the vehicle-trailer model;
  at least one of the kinematic parameters is a dimension within the vehicle-trailer model that is one of input by a user or estimated by the system;
  the control parameter is a commanded curvature of the backing path, and the predicted behavior of the characteristic is determined using the control parameter;
  the control parameter is a hitch angle between a vehicle and a trailer in the vehicle-trailer combination, and the predicted behavior of the characteristic is determined using a commanded curvature of the backing path;
  the characteristic of the vehicle-trailer combination is a steady-state steering angle achieved by the system when the control parameter is constant;
  the controller adjusts the control parameter by scaling the control parameter by a function of the error;
  the characteristic is a hitch angle rate between a vehicle and a trailer in the vehicle-trailer combination; and
  the steering signal is further based on a measurement of a hitch angle between a vehicle and a trailer in the vehicle-trailer combination, and adjusting the control parameter based on the error compensates for an inaccuracy of the measurement of the hitch angle.

According to another aspect of the present disclosure, a vehicle includes a steering system and a controller. The controller outputs a steering signal based on a commanded curvature of a backing path to the steering system to maintain a trailer articulably coupled with the vehicle along a commanded backing path, determines an error between a measured steady-state steering angle achieved by the system when the commanded curvature is constant and a predicted steady-state steering angle based on the commanded curvature, and adjusts the commanded curvature based on the error.

According to another aspect of the present disclosure, a method for assisting in reversing of a vehicle-trailer combination includes outputting a steering signal based on a control parameter to a steering system of a vehicle in the vehicle-trailer combination to maintain a trailer in the vehicle-trailer combination along a commanded backing path. The method further includes determining an error between a measured behavior of a characteristic of the vehicle-trailer combination and a predicted behavior of the characteristic and adjusting the control parameter based on the error.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
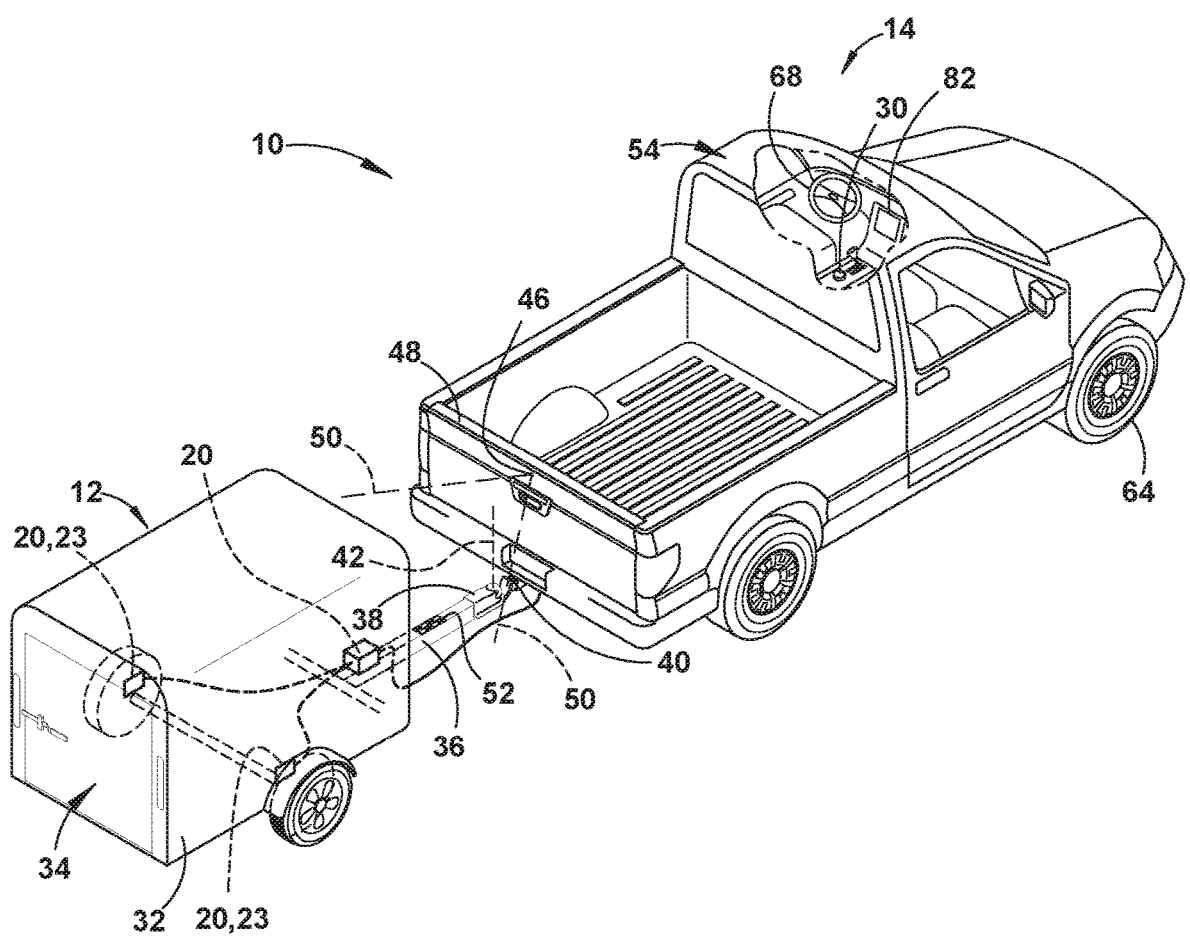
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-11, reference numeral 10 generally designates a trailer backup assist system for assisting in reversing of a vehicle 14 and trailer 12 combination, wherein the trailer 12 is articulably coupled with the vehicle 14, such as about a hitch connection 42. System 10 includes a vehicle steering system 62 and a controller 28 that outputs a steering signal based on a control parameter to the steering system 62 to maintain the trailer 12 along a commanded backing path 26, as discussed in general with respect to FIGS. 1-7. The controller 28 further determines an error between a measured behavior of a characteristic of the vehicle-trailer combination and a predicted behavior of the characteristic and adjusts the control parameter based on the error, as discussed in greater detail with respect to FIGS. 8-11, below.

Figure 2:
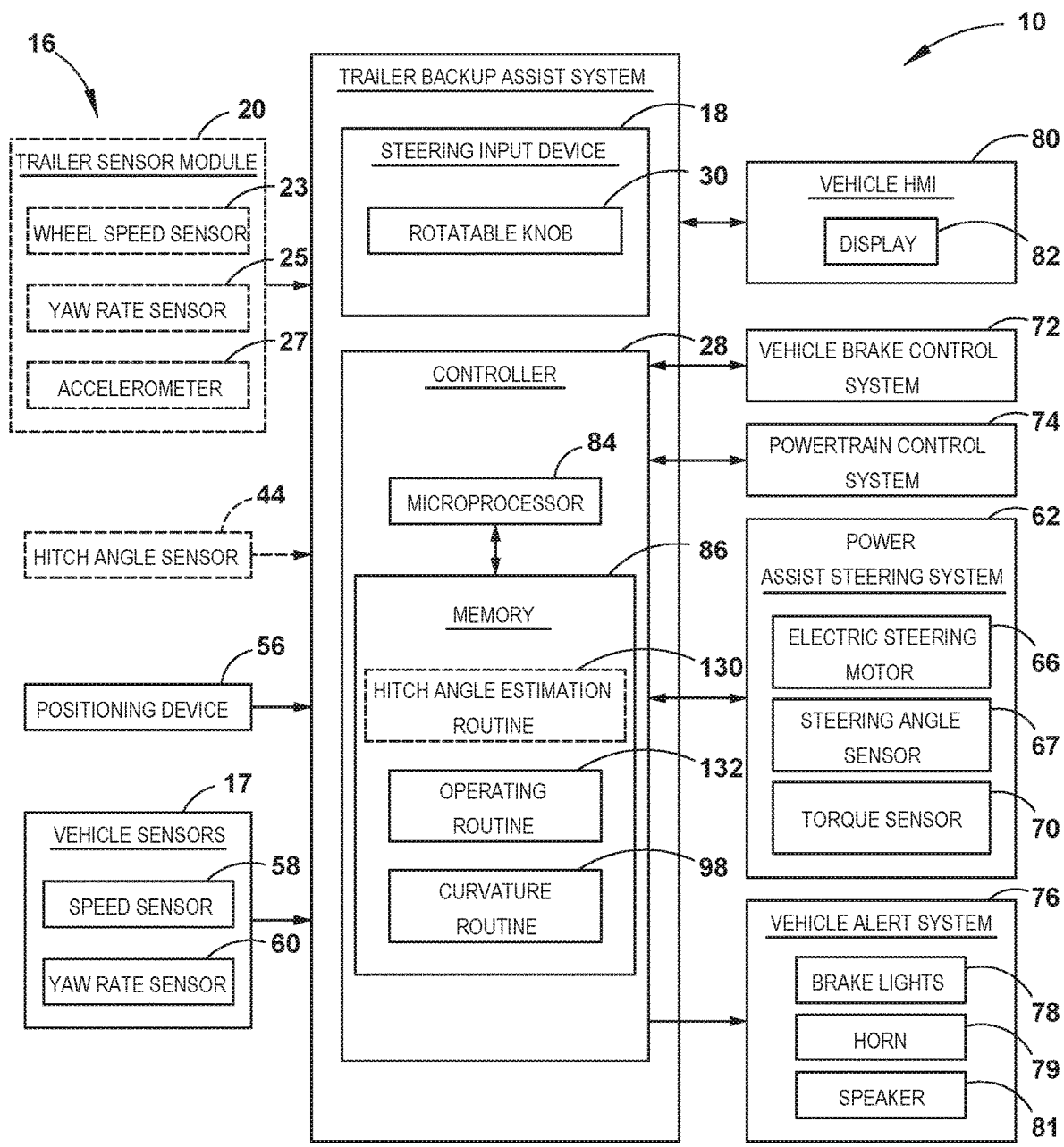
FIG. 2 is a block diagram illustrating one embodiment of the trailer backup assist.

As shown in FIGS. 1 and 2, system 10 may generally be useable for controlling a backing path 26 (FIG. 6) of a trailer 12 attached to a vehicle 14 by allowing a driver of the vehicle 14 to specify a desired curvature $\kappa_2$ of the backing path 26 of the trailer 12. In one embodiment, the trailer backup assist system 10 automatically steers the vehicle 14 to guide the trailer 12 on the desired curvature $\kappa_2$ or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a hitch angle sensor 44, such as a vision-based system that employs a camera 46 on the vehicle 14 to monitor a target 52 on the trailer 12 to determine the hitch angle γ. In another embodiment, hitch angle estimates obtained using such a vision-based sensor could be combined with other measurements or estimates to further increase reliability of the overall estimated hitch angle γ. In another embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimate a hitch angle γ based on the trailer yaw rate $\omega_2$, the vehicle yaw rate $\omega_1$, and the vehicle speed $v_1$ in view of a kinematic relationship between the trailer 12 and the vehicle 14.

With respect to the general operation of the trailer backup assist system 10, a steering input device 18 may be provided, such as a rotatable, or otherwise moveable, knob 30, for a driver to provide the desired curvature $\kappa_2$ of the trailer 12. As such, the steering input device 18 may be operable between a plurality of selections, such as successive rotated positions of a knob 30, that each provide an incremental change to the desired curvature $\kappa_2$ of the trailer 12. Upon inputting the desired curvature $\kappa_2$, the controller 28 may generate a steering command for the vehicle 14 to guide the trailer 12 on the desired curvature $\kappa_2$ based on the estimated hitch angle γ and a kinematic relationship between the trailer 12 and the vehicle 14.

With reference to the embodiment shown in FIG. 1, the vehicle 14 is a pickup truck embodiment that is equipped with one embodiment of the trailer backup assist system 10 for controlling the backing path 26 (FIG. 6) of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ (referred to in some instances herein as an articulable coupling). It should be appreciated that additional embodiments of the trailer 12 may alternatively couple with the vehicle 14 to provide a pivoting or articulating connection, such as by connecting with a fifth wheel connector. It is also contemplated that additional embodiments of the trailer 12 may include more than one axle and may have various shapes and sizes configured for different loads and items, such as a boat trailer or a flatbed trailer.

Referring to FIGS. 1 and 2, the sensor system 16 in the illustrated embodiment includes one of a sensor module 20 or a vision-based hitch angle sensor 44 for estimating or facilitating measurement of the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 can be mounted on the tongue 36 of the trailer 12 proximate the enclosed cargo area 34 and, in one example, can include left and right wheel speed sensors 23 on laterally opposing wheels of the trailer 12. It is conceivable that such wheel speed sensors 23 may be bi-directional wheel speed sensors for monitoring both forward and reverse speeds. Also, it is contemplated that the sensor module, in additional embodiments, may be mounted on alternative portions of the trailer 12, or dispersed among trailer 12, depending on the particular sensors used therein, which in turn may vary depending on the information obtained and used from sensor module 20, if present.

The sensor module 20 can generate a plurality of signals indicative of various dynamics of the trailer 12. The signals may include a yaw rate signal, a lateral acceleration signal, and wheel speed signals that may be generated respectively by a yaw rate sensor 25, an accelerometer 27, and the wheel speed sensors 23 It is conceivable that the accelerometer 27, in some embodiments, may be two or more separate sensors and may be arranged at an offset angle, such as two sensors arranged at plus and minus forty-five degrees from the longitudinal axis of the trailer 12 or arranged parallel with the longitudinal and lateral directions of the trailer 12, to generate a more robust acceleration signal, should such a signal be used by controller 28. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

With reference to the embodiment of the trailer backup assist system 10 shown in FIG. 2, the sensor module 20 and the hitch angle sensor 44 are provided in dashed lines to illustrate that in various embodiments one or the other may be utilized in system 10. Further, the various components useable in sensor module 20, including the wheel speed sensor 23, the trailer yaw rate sensor 25, and accelerometer 27 may be used individually or in various combinations thereof, depending on the particular implementation of hitch angle estimation routine 130 and curvature routine 98 and the information utilized thereby. The illustrated embodiment of the trailer backup assist system 10 receives vehicle 14 and trailer 12 status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed $v_1$, steering angle δ, and hitch angle γ. Other vehicle information received by the trailer backup assist system 10 may include a speed of the vehicle 14 from a speed sensor 58 and a yaw rate $\omega_1$ of the vehicle 14 from a yaw rate sensor 60. It is contemplated that in additional embodiments, the hitch angle sensor 44 and other vehicle sensors 17 and devices may provide sensor signals or other information, such as proximity sensor signals or successive images of the trailer 12, that the controller 28 of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature $\kappa_2$ of the trailer 12. In the illustrated embodiment, the power assist steering system 62 is an electric power-assisted steering (EPAS) system that includes an electric steering motor 66 for turning the steered wheels 64 to a steering angle δ based on a steering command, whereby the steering angle δ may be sensed by a steering angle sensor 67 of the power assist steering system 62. The steering command may be provided by the trailer backup assist system 10 for autonomously steering during a backup maneuver and may alternatively be provided manually via a rotational position of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Figure 8:
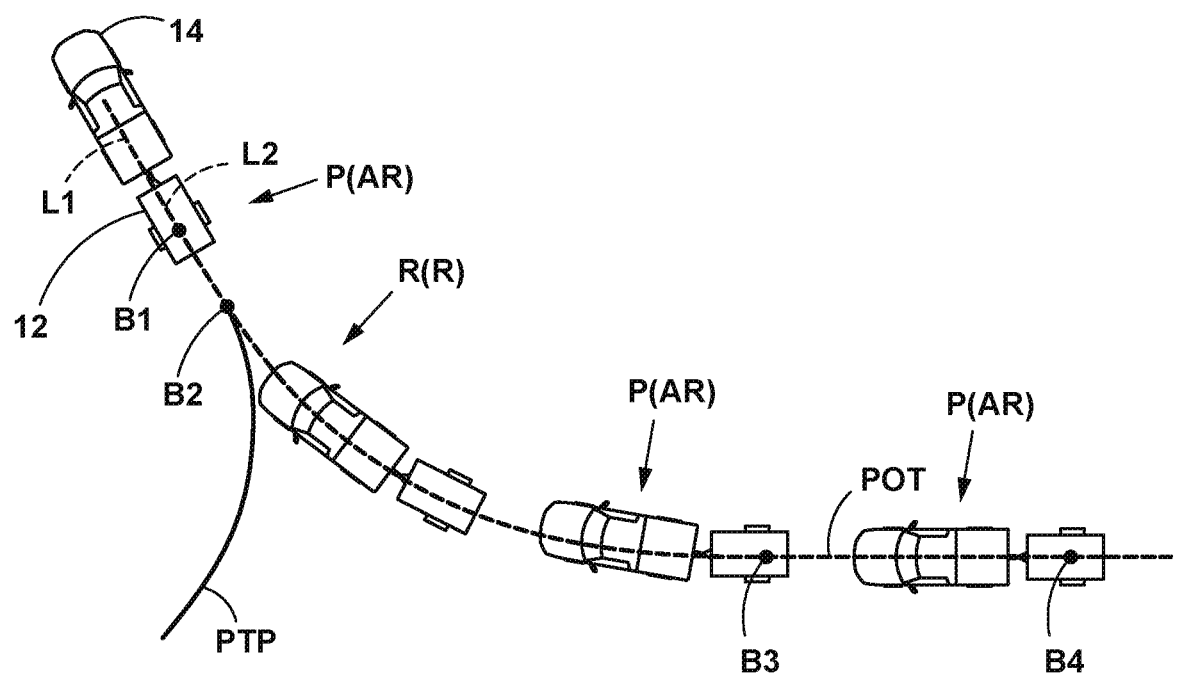
FIG. 8 is a schematic diagram showing a backup sequence of a vehicle and a trailer implementing various sequential curvature selections with the trailer backup assist system, according to one embodiment.
Figure 9:
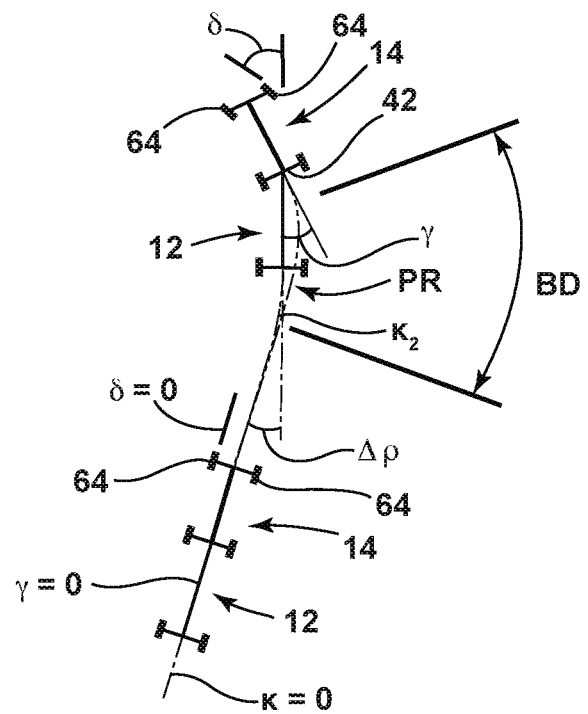
FIG. 9 is a schematic view showing a vehicle backing a trailer along a path including returning the trailer to a zero curvature segment.

Referring again to the embodiment illustrated in FIG. 2, the power assist steering system 62 provides the controller 28 of the trailer backup assist system 10 with information relating to a rotational position of steered wheels 64 of the vehicle 14, including a steering angle δ. The controller 28 in the illustrated embodiment processes the current steering angle δ, in addition to other vehicle 14 and trailer 12 conditions to guide the trailer 12 along the desired curvature $\kappa_2$ (FIGS. 8 and 9). It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed $v_1$ may also be determined from the powertrain control system 74, the speed sensor 58, and the positioning device 56, among other conceivable means. In some embodiments, individual wheel speeds can also be used to determine a vehicle yaw rate $\omega_1$, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle γ on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path 26 (FIG. 6) of travel of the trailer 12 for the controller 28 to process and generate steering commands. More specifically, the steering input device 18 may provide a selection or positional information that correlates with a desired curvature $\kappa_2$ of the desired backing path 26 of travel of the trailer 12. Also, the trailer steering commands provided by the steering input device 18 can include information relating to a commanded change in the path of travel, such as an incremental change in the desired curvature $\kappa_2$, and information relating to an indication that the trailer 12 is to travel along a path defined by a longitudinal centerline axis of the trailer 12, such as a desired curvature value of zero that defines a substantially straight path of travel for the trailer 12. As will be discussed below in more detail, the steering input device 18 according to one embodiment may include a movable control input device for allowing a driver of the vehicle 14 to command desired trailer steering actions or otherwise select and alter a desired curvature $\kappa_2$. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature $\kappa_2$ or other information defining a desired backing path 26, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, a trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
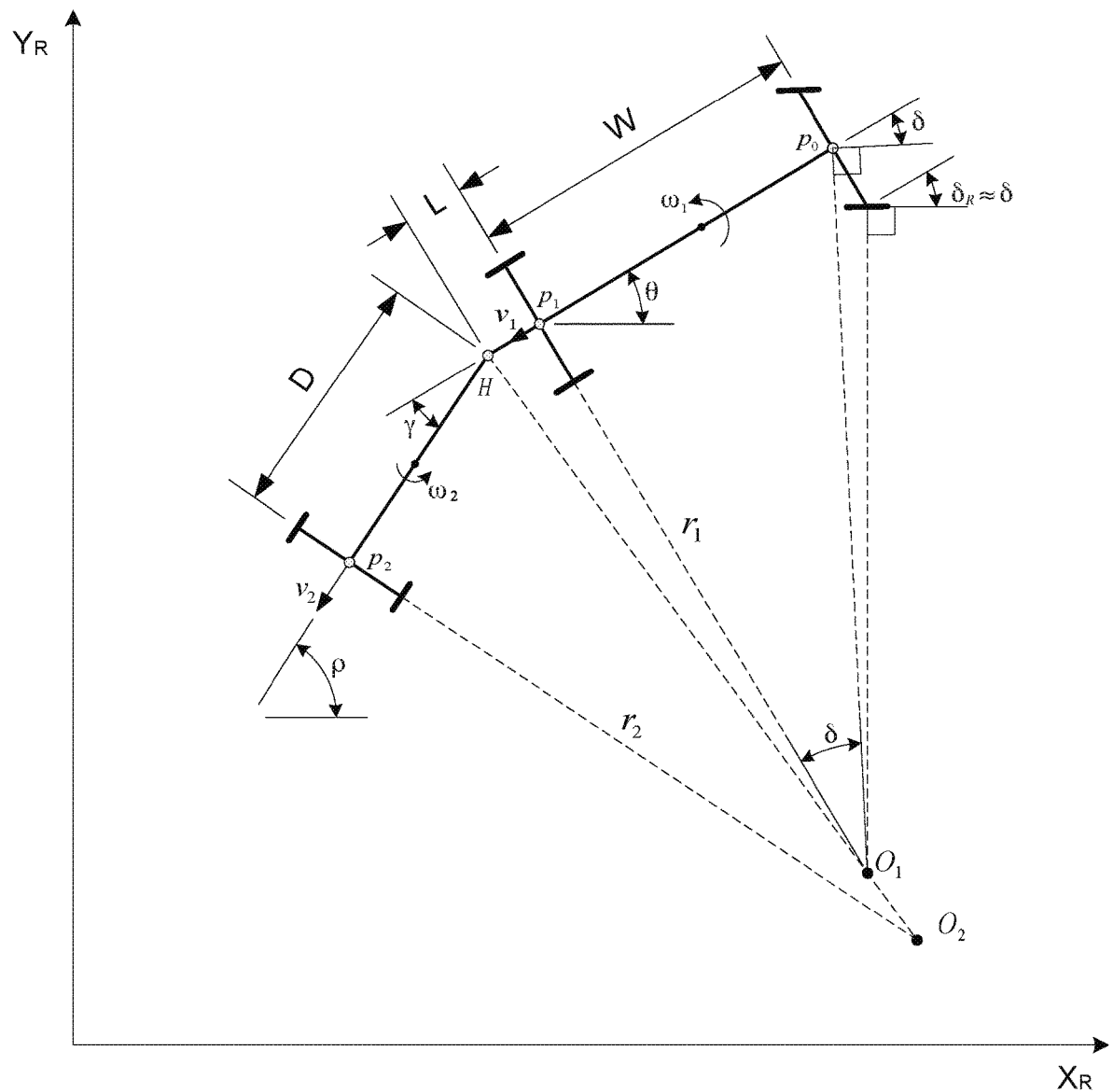
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle δ of the vehicle 14 towing the trailer 12, which can be desirable for a trailer backup assist system 10 configured in accordance with some embodiments, including for use by a curvature routine 98 of the controller 28 (FIG. 2) in one embodiment. To achieve such a kinematic relationship, certain assumptions may be made with regard to parameters associated with the vehicle 14 and trailer 12 combination. Examples of such assumptions include, but are not limited to, the trailer 12 being backed by the vehicle 14 at a relatively low speed, wheels 64 of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, a vehicle-trailer model of the kinematic relationship, as illustrated and described below, is based on various parameters associated with the vehicle 14 and the trailer 12. These parameters include:

δ: steering angle at steered front wheels 64 of the vehicle 14;
θ: yaw angle of the vehicle 14;
ρ: yaw angle of the trailer 12;
γ: hitch angle (γ=ρ−θ);
W: wheel base of the vehicle 14;
L: drawbar length between hitch point 42 and rear axle of the vehicle 14;
D: distance (trailer length) between hitch point 42 and axle of the trailer 12 or effective axle for a multiple axle trailer; and
$r_2$: curvature radius for the trailer 12.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\rho}$ is trailer yaw rate and is trailer velocity).

$$\kappa_2 = \frac{1}{r_2} = \frac{\dot{\rho}}{\dot{\eta}} = \frac{\left(W + \frac{Kv_1^2}{g}\right)\sin\gamma + L\cos\gamma\tan\delta}{D\left(\left(W + \frac{Kv_1^2}{g}\right)\cos\gamma - L\sin\gamma\tan\delta\right)} \quad (1)$$

This relationship can be expressed to provide the steering angle δ as a function of desired trailer path curvature $\kappa_2$ and hitch angle γ.

$$\delta = \tan^{-1}\left(\frac{\left(W + \frac{Kv_1^2}{g}\right)[\kappa_d D\cos\gamma - \sin\gamma]}{DL\kappa_d\sin\gamma + L\cos\gamma}\right) = F(\gamma, \kappa_d, K) \quad (2)$$

Accordingly, for a particular vehicle 14 and trailer 12 combination, certain parameters (e.g., D, W and L) of the kinematic relationship are constant and assumed known. $v_1$ is the vehicle longitudinal speed and g is the acceleration due to gravity. K is a speed dependent parameter which, when set to zero, makes the calculation of steering angle independent of vehicle speed. For example, vehicle-specific parameters of the kinematic relationship in the form of relevant dimensions can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Desired trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance for the trailer drawbar length L between the pivoting connection and the rear axle of the vehicle 14 is equal to zero for purposes of operating the trailer backup assist system 10 when a gooseneck trailer or other similar trailer is connected with a hitch ball or a fifth wheel connector located over a rear axle of the vehicle 14. The assumption is essentially that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue 36 configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue 36 configuration.

Figure 4:
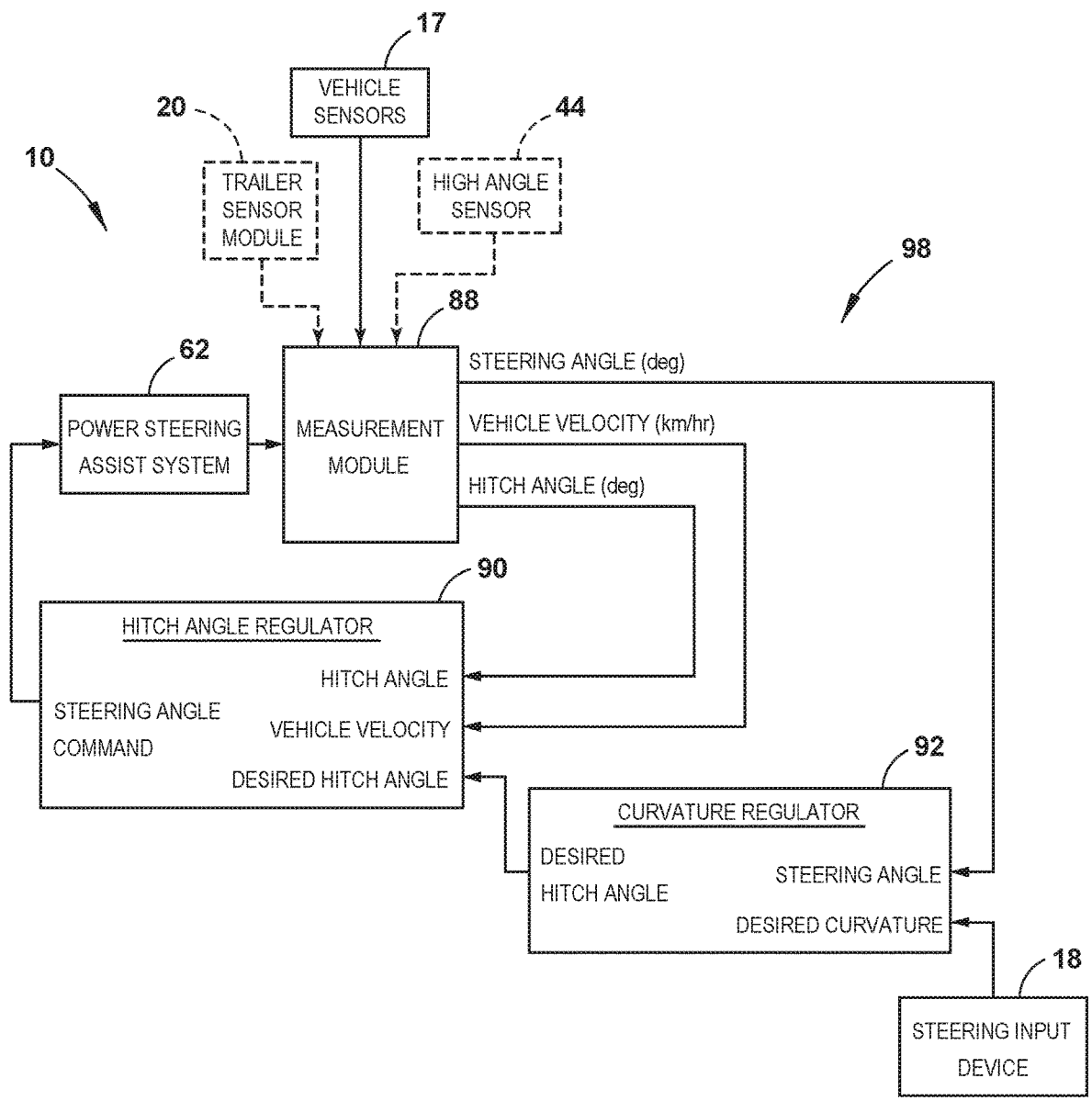
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 (FIG. 2) of the controller 28 (FIG. 2). In the illustrated layout, the steering input device 18 provides a desired curvature $\kappa_2$ value to the curvature regulator 92 of the controller 28, with the curvature regulator 92 and hitch angle regulator 90 working to bring the hitch angle $\gamma$ to a value corresponding with the desired curvature $\kappa_2$ within a portion of a resulting overall backing path 26 by controlling the steering angle $\delta$ of vehicle 14. The curvature regulator 92 computes a desired hitch angle $\gamma_{ref}$ based on the current desired curvature $\kappa_2$ along with the steering angle $\delta$ provided by a measurement module 88 in this embodiment of the controller 28. The measurement module 88 may be a memory device separate from or integrated with the controller 28 that stores data from sensors of the trailer backup assist system 10, such as the hitch angle sensor 44 (FIG. 2), the vehicle speed sensor 58 (FIG. 2), the steering angle sensor 67 (FIG. 2), or alternatively the measurement module 88 may otherwise directly transmit data from the sensors without functioning as a memory device. Once the desired hitch angle $\gamma_{ref}$ is computed by the curvature regulator 92, the hitch angle regulator 90 generates a steering angle command based on the computed desired hitch angle $\gamma_{ref}$ as well as a measured or otherwise estimated hitch angle $\hat{\gamma}$ and a current velocity of the vehicle 14. The steering angle command is supplied to the power assist steering system 62 of the vehicle 14, with curvature routine 98 operating on a closed-loop basis to continuously account for the dynamics of the system 10 during operation. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system 10 is an input, $\kappa_2$, which represents the desired curvature of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right) \quad (3)$$

The output hitch angle of $p(\kappa_2, \delta)$ is provided as the reference signal, $\gamma_{ref}$, for the remainder of the control system 10, although the steering angle $\delta$ value used by the curvature regulator 92 is feedback from the measurement module as a result of the non-linear function of the hitch angle regulator 90 for the steering angle command fed to power assist steering system 62 and the actual movement of steered wheels 64 achieved thereby. In the illustrated embodiment, the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right) \quad (4)$$

The auxiliary variable u is the output from a proportional integral (PI) controller, whereby the integral portion substantially eliminates steady-state tracking error. More specifically, the control system 10 illustrated in FIG. 4 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta} \quad (5)$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right) \quad (6)$$

It is contemplated that the PI controller may have gain terms based on trailer length D since shorter trailers will generally have faster dynamics. In addition, the hitch angle regulator 90 may be configured to prevent the desired hitch angle $\gamma_{ref}$ to reach or exceed a jackknife angle $\gamma_{jk}$, as computed by the controller 28 or otherwise determined by the trailer backup assist system 10, as disclosed in greater detail herein.

Figure 5:
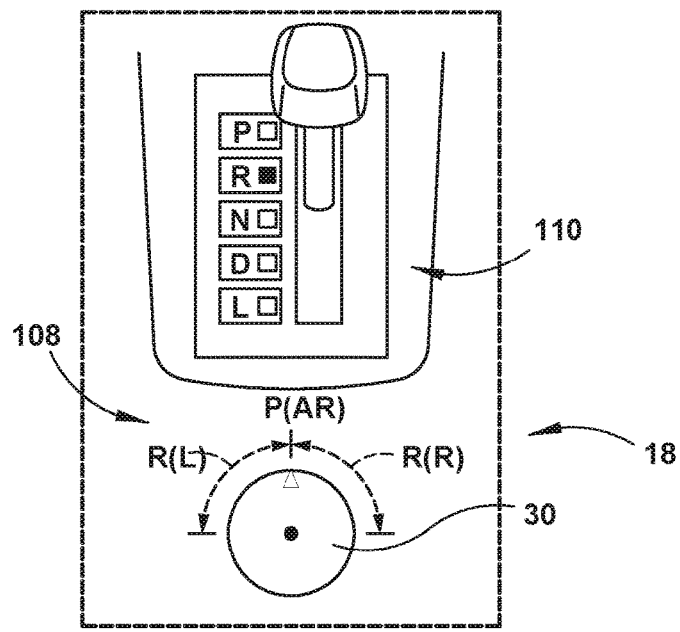
FIG. 5 is a plan view of a steering input device having a rotatable knob for operating the trailer backup assist system, according to one embodiment.
Figure 6:
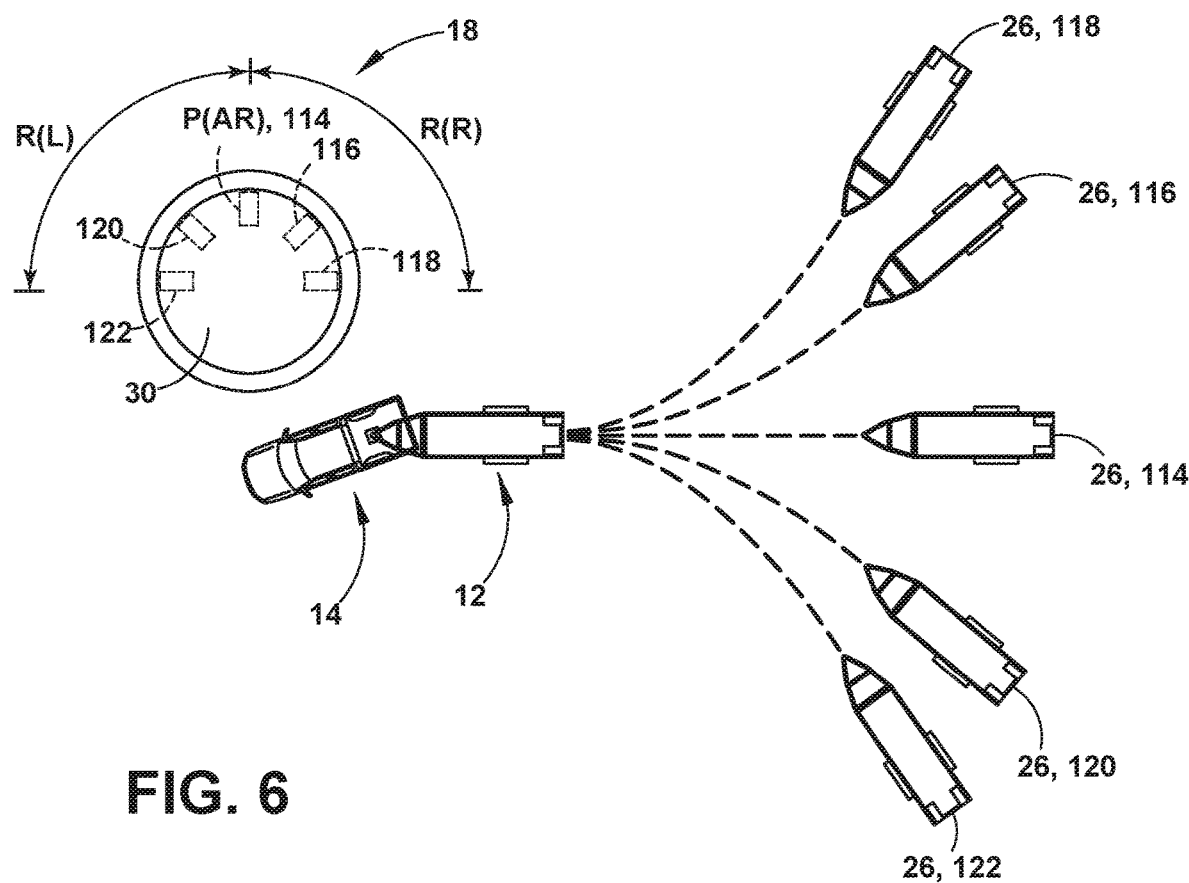
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired curvature $\kappa_2$ of the trailer 12. More specifically, the angular position of the rotatable knob 30 may correlate with a curvature input, such that rotation of the knob 30 to a different angular position provides a different commanded curvature $\kappa_2$ with an incremental change based on the amount of rotation and, in some embodiments, a normalized rate, as described in greater detail herein.

Figure 7:
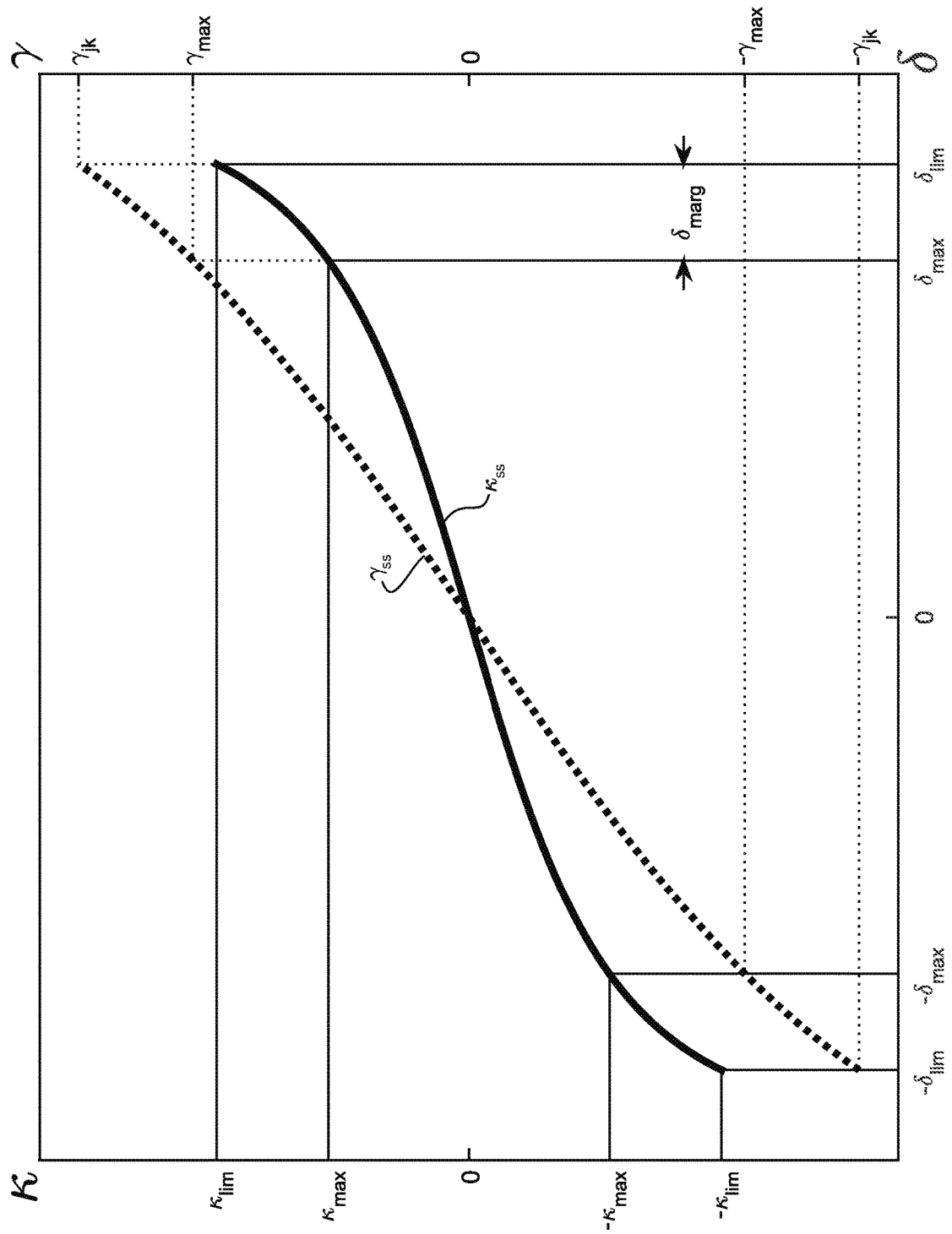
FIG. 7 is a graphical representation of a steady-state relationship between a vehicle steering angle and a resulting trailer curvature and hitch angle.

The rotatable knob 30, as illustrated in FIG. 5, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one R(L) of the opposing rotational ranges of motion R(L), R(R). To provide a tactile indication of an amount of rotation of the rotatable knob 30, a torque that biases the knob 30 toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as a function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature $\kappa_2$ output to the controller 28. The at-rest position P(AR), 114 of the knob 30 corresponds to a signal indicating that the vehicle 14 should be steered such that the trailer 12 is backed along a substantially straight backing path 114 (as indicated by the numbering of the position 114 of knob 30 corresponding with the particular path 114 achieved) corresponding with a zero trailer curvature request from the driver), as defined by the longitudinal axis of the trailer 12 when the knob 30 was returned to the at-rest position P(AR). A maximum clockwise and anti-clockwise position of the knob 30 (i.e., limits of the opposing rotational ranges of motion R(R), R(L) in FIG. 5) may each correspond to a respective signal indicating a maximum allowed curvature $\kappa_{max}$ (i.e., most acute trajectory or smallest radius of curvature) of a path of travel of the trailer 12 that is allowed by the controller, chosen to be less than the limiting curvature $\kappa_{lim}$ corresponding to a jackknife condition. FIG. 7 illustrates an example of the steady-state relationships (which depend on the trailer length D and the hitch position L) between steering angle $\delta$, trailer curvature $\kappa_2$, and hitch angle $\gamma$. The steering system imposes a physical limit on the maximum steering angle, denoted $\delta_{lim}$. The trailer curvature corresponding to a steering wheel angle $\delta_{lim}$ is denoted $\kappa_{lim}$, while the corresponding hitch angle is the jackknife angle $\gamma_{jk}$. If the hitch angle $\gamma$ reaches or exceeds the jackknife angle $\gamma_{jk}$, the steering system will subsequently not be able to countersteer as required in order to reduce the hitch angle $\gamma$ while continuing to reverse the trailer. Furthermore, the closer the hitch angle $\gamma$ is to the jackknife angle $\gamma_{jk}$, the greater will be the backing distance required to reduce or zero the hitch angle. Therefore, the system 10 may limit the desired curvature $\kappa_d$ to an interval $[-\kappa_{max}, \kappa_{max}]$, where $0<\kappa_{max}<\kappa_{lim}$. The maximum allowed curvature $\kappa_{max}$ may be chosen so as to satisfy certain performance objectives, as described below.

Returning to FIG. 6, a driver can turn the rotatable knob 30 to provide a desired curvature $\kappa_2$, within the available ranges of directional positions, while the driver of the vehicle 14 backs the trailer 12. In the illustrated embodiment, the rotatable knob 30 rotates about a central axis between a center or middle position 114 corresponding to a substantially straight backing path 26 of travel (i.e. zero curvature), as defined by the longitudinal axis of the trailer 12, and various rotated positions 116, 118, 120, 122 on opposing sides of the middle position 114, commanding a desired curvature $\kappa_2$ (which may be referred to as the "curvature command") corresponding to a radius of the desired backing path 26 of travel for the trailer 12 at the corresponding one of the commanded rotated positions 116, 118, 120, 122. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Referring to FIG. 8, an example of using the steering input device 18 (FIG. 5) for dictating a curvature $\kappa_2$ of a desired backing path 26 (FIG. 6) of travel (POT), or portion thereof, of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axes L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 (FIG. 5) of the trailer backup steering input device 18 (FIG. 5) remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 122 (FIG. 6) of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 as necessary for causing the trailer 12 to be steered to the right as a function of an amount of rotation of the rotatable knob 30 with respect to the at-rest position P(AR), a rate movement of the knob 30, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary to cause the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 8, in order to activate the trailer backup assist system 10, the driver interacts with the trailer backup assist system 10 and the system 10 automatically steers as the driver reverses the vehicle 14. As discussed above, the driver may command the trailer backing path by using a steering input device 18 and the controller 28 may determine the vehicle steering angle $\delta$ to achieve the desired curvature $\kappa_2$, while the driver controls the throttle and brake.

Figure 10:
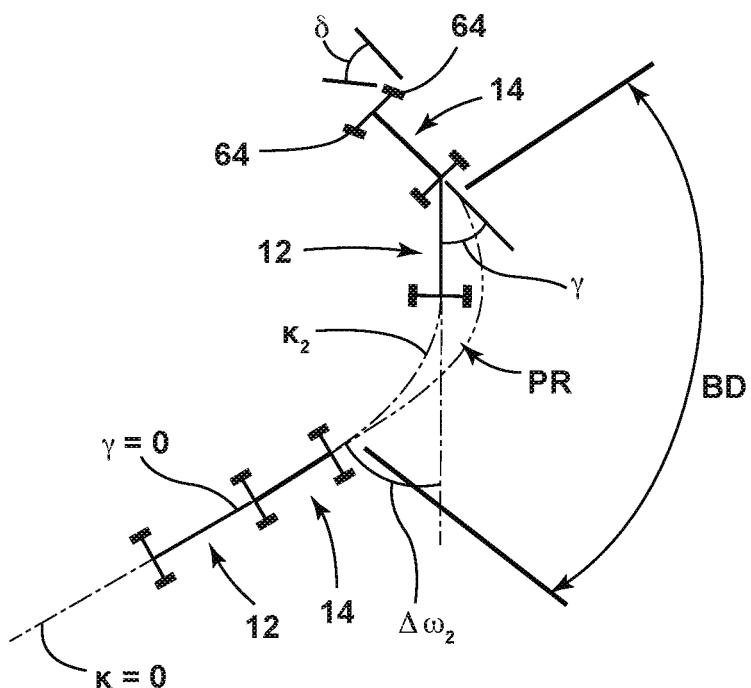
FIG. 10 is a schematic view showing the vehicle backing the trailer along a further path including returning the trailer to a zero curvature segment.

Referring now to FIG. 9, a schematic view of a vehicle 14 reversing a trailer 12 is shown during a sequence of backing maneuvers implemented using a particular embodiment of the steering input device 18 (FIG. 6), including a rotatable knob 30 (FIG. 6), as described above. In this sequence, it is shown that upon initially reversing under a particular curvature command $\kappa_2$ (as implemented by system 10 by controlling the steering angle $\delta$ of the wheels 64 (FIG. 1) of vehicle 14, as described above), the combined vehicle 14 and trailer 12 will reach a particular steady-state hitch angle and trailer curvature. If the steering input device 18 is then turned to the at-rest position P(AR), the combined trailer 12 and vehicle 14 will go through a return-to-zero ("RTZ") path PR of a certain distance after the knob 30 is turned to a zero curvature command position before the hitch angle $\gamma$ reaches zero. As illustrated, two relevant factors associated with the RTZ path PR are the backing distance BD required reaching a sufficiently small hitch angle to effectively consider the hitch angle to be "zeroed" (or the length of RTZ path PR) and the change in trailer yaw angle $\Delta\rho$ over the distance BD of RTZ path PR. These quantities are illustrated in FIGS. 9 and 10, wherein in FIG. 10, an initially tighter curvature command $\kappa_2$ is illustrated in which a larger initial hitch angle $\gamma$ results, requiring a greater backing distance BD and greater change in trailer yaw angle $\Delta\rho$ to "zero" the hitch angle $\gamma$. It is noted that, a sufficiently small hitch angle for consideration as having been zeroed may include a hitch angle that is not maintained at zero under steady state conditions, but is, rather, within a relatively small, predefined interval around zero, such as +/−1 degree. A zero steady state hitch angle is not required for consideration as zeroed, as the hitch angle only converges, asymptotically toward zero, such that a zero hitch angle is not actually maintained.

As discussed above, in one aspect, the measurements for trailer length D and, in some instances, hitch position L are provided by the user. From these user-supplied quantities, system 10 may determine appropriate values for a maximum allowed curvature $\kappa_{max}$ and a maximum allowed steady-state hitch angle $\gamma_{max}$. These values may be chosen, at least in part, to meet performance specifications in terms of the above-described RTZ metrics. Specifically, the maximum allowable curvature $\kappa_{max}$ may be chosen so that, starting from steady-state under a maximum trailer curvature request $\kappa_2=\kappa_{max}$, the hitch angle can be zeroed within a predetermined backing distance, and the change in trailer yaw angle over the same distance is less than a predetermined angle. Since zeroing the hitch angle requires countersteering, the performance of system 10 on the described metrics is closely related to the steering angle "margin" $\delta_{marg}=\delta_{lim}-\delta_{max}$, where $\delta_{lim}$ is the physical steering angle limit and $\delta_{max}$ is the steady-state steering angle during a maximum curvature request. The maximum allowed curvature $\kappa_{max}$ may therefore be determined by first choosing a steering angle margin which ensures adequate performance, and then computing the steady-state curvature $\kappa_{max}$ corresponding to the steering angle $\delta_{max}=\delta_{lim}-\delta_{marg}$. However, as can be appreciated based on the above description of the general backing operation of system 10, the calculation of the steady-state curvature $\kappa_{max}$ corresponding to a given steady-state steering angle $\delta_{max}$ and the closed loop control law used to steer vehicle 14 given a curvature request $\kappa_2$, both depend on the, in this case user-provided, values for trailer length D and hitch position L. Accordingly, if there is an error in one or more of these values, the actual steering angle margin $\delta_{lim}-\delta$ available when the system 10 is at steady state in response to a maximum curvature request $\kappa_2=\kappa_{max}$ may be greater than or less than the desired margin $\delta_{marg}$. In particular, if a maximum steady-state steering angle $\delta_{max}$ is determined based on the desired margin, but is set lower, due to a parameter error, than what the actual parameter values may allow, the system 10 may behave more conservatively than what may be intended. In this respect, the error may result in system 10 setting the maximum curvature $\kappa_{max}$ lower than necessary to achieve the desired performance. Conversely, if the maximum steady-state steering angle $\delta_{max}$ is set higher than what accurate parameter values would allow, the system 10 may operate with steady-state hitch angles $\gamma$ closer to the jackknife angle $\gamma_{jk}$ than desired to achieve desired RTZ performance. If the errors are sufficiently large, the system 10 may be prevented from reaching any equilibrium, meaning that the hitch angle $\gamma$ could reach the jackknife angle $\gamma_{jk}$ if backed far enough under a large curvature request.

Further, in some implementations of system 10, controller 28 (FIG. 2) may estimate, by calculations performed during driving of the vehicle 14 and trailer 12 combination, for example, values for trailer length D and/or hitch position L. Various implementations of systems 10 using such estimates are described in co-pending, commonly-assigned U.S. patent application Ser. Nos. 15/331,517, 15/046,531, and 14/736,391, the entire disclosures of which are hereby incorporated by reference herein. These and other systems 10 with the capability to estimate and/or calculate trailer length D and/or hitch position L may not be completely accurate or may refine their estimates or calculations over time, such that at various instances during use of the estimates in backing of the trailer 12 and vehicle 14 combination using system 10, errors in the values for trailer length D and/or hitch position L may be present, with similar results as to those described above with respect to the human-derived errors. Still further, various systems and methods for measuring, estimating, or otherwise determining the hitch angle $\gamma$ may include inaccuracies that result in a direct error in the determination of the hitch angle $\gamma$ in a manner that can similarly affect the RTZ performance of the vehicle 14 and trailer 12 combination.

Figure 11:
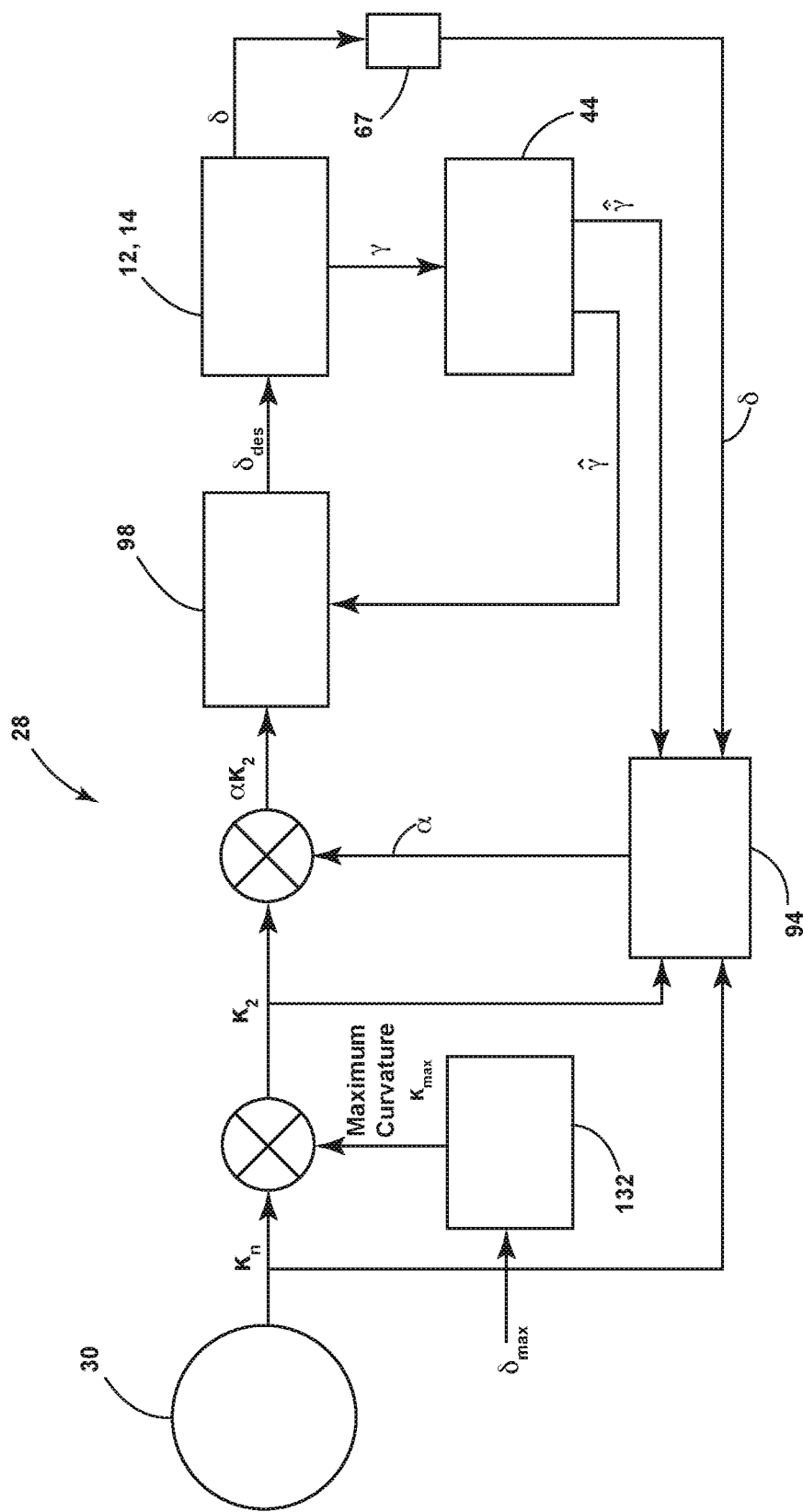
FIG. 11 is a schematic diagram of a controller employing a compensator to adjust to a control parameter to compensate for errors affecting the performance in returning the trailer to a zero hitch angle.

Accordingly, as shown in FIG. 11, a variation of system 10 is shown in which controller 28 includes a compensator 94 that can, as discussed above, monitor system 10 behavior according to a measured characteristic related to RTZ performance of the vehicle 14 and trailer 12 combination and adjust a control parameter of system 10 based on an error between the measured characteristic and a predicted behavior of the characteristic. In the embodiment of FIG. 11, for example, the measured characteristic may be the steering angle $\delta$ of vehicle 14, which is known and measured by EPAS system 62. As discussed above, system 10 receives the requested curvature $\kappa_2$ as an input from a user by way of the rotatable knob 30 (FIG. 6) or other comparable device. Controller 28 then takes the requested curvature $\kappa_2$, along with the available values for trailer length D, the drawbar length L, wheelbase W, and the measured or estimated hitch angle $\gamma$ to determine a desired steering angle $\delta_{des}$ using equation (2), above.

As discussed above, the present embodiment takes advantage of the system 10 obtaining a direct, and assumed accurate, measurement of the actual steering angle $\delta$. When the vehicle 14 is backing the trailer 12 under the depicted closed-loop control arrangement, and when the hitch angle γ is near steady-state (i.e., the hitch angle rate $\dot{\gamma}$ is sufficiently close to zero), when accurate values for trailer length D and hitch position L are present, the system 10 should achieve a steering angle δ close to the predicted steering angle $\delta_{pred}$, where the predicted steering angle is given by the following equation:

$$\delta_{pred} = \tan^{-1}\left(\frac{W}{\sqrt{D^2 - L^2 + 1/\kappa_2^2}}\right). \quad (7)$$

An error in the values for one or more of trailer length D, drawbar length L, and measured hitch angle γ will result in an error between the achieved steering angle δ at such a steady-state condition and the predicted steering angle $\delta_{pred}$, which error can be expressed as:

$$e_{\delta,ss} := \delta - \delta_{pred}. \quad (8)$$

The error $e_{\delta,ss}$ does not provide enough information to determine which parameter or parameters (trailer length D or hitch position L) or measurement (hitch angle γ) is in error or what the value of such error (or errors). However, it does correlate with the effect of such parameter or measurement errors on the RTZ performance metrics described above. In this manner, the control parameter can be adjusted based on the error in the measured characteristic (i.e. the steering angle δ) to obtain the desired steering angle $\delta_{des}$, as illustrated in FIG. 11.

In one embodiment, the desired curvature $\kappa_2$ commanded by the user by way of knob 30 can be set as the relevant control parameter and can be, accordingly, scaled by a factor proportionate to the integral of the steady state error $e_{\delta,ss}$ to reduce the error $e_{\delta,ss}$ and, accordingly, improve the RTZ performance of system 10 in reversing the vehicle 14 and trailer 12 combination. In effect, this results in replacing the desired curvature $\kappa_2$ input in the control law of equation 2, above, with the scaled curvature input $\alpha\kappa_2$, where α is the scale factor. In operation, the scale factor may be initially (i.e., during the first use of system 10 or the first use of system 10 with a particular trailer 12) set to a value $\alpha_0$ less than or equal to one. During use of system 10 to reverse the vehicle 14 and trailer 12 combination, system 10 monitors for a steady-state backing condition (such as with respect to the desired curvature input $\kappa_2$ and/or hitch angle γ) and compares the actual steering angle δ with the predicted steering angle $\delta_{pred}$ using the steady state condition measurements and available kinematic parameter values. If $e_{\delta,ss}$ is non-zero, the scale factor α is adjusted based on the error in accordance with an update law to reduce the steady-state error $e_{\delta,ss}$. One example of such an update law is:

$$\alpha = \alpha_0 + \int_0^t k_{adapt} \, \text{sgn}(\delta_{pred}) e_{\delta,ss} dt, \quad (9)$$

where $k_{adapt}$ is an adaptation gain that can be computed, for example, as a function of other quantities. For example, by reducing or zeroing $k_{adapt}$ when the estimated hitch angle rate $\dot{\gamma}$ is above a selected threshold, system 10 can provide the adaptation only when the trailer 12 and vehicle 14 combination is at or near steady-state. It is also possible to reduce or zero $k_{adapt}$ when the curvature command $\kappa_2$ is relatively small (e.g., when $|\kappa_2/\kappa_{max}| < 0.9$, where $\kappa_{max}$ is the maximum allowed curvature) so that the adaptation is applied only for larger curvature commands (within 10% of $\kappa_{max}$), which may be considered as corresponding to larger steady-state hitch angles γ.

A simplified block diagram of such a control scheme is shown in FIG. 11. In particular, controller 28 is provided with compensator 94 that includes the update law (equation 10, for example) for the scale factor α, as well as the function computing the adaptation gain $k_{adapt}$. In this manner, the compensator 94 can take the curvature command (or desired curvature) $\kappa_2$ as one input, which is used, as discussed above, to determine the predicted steering angle $\delta_{pred}$. The compensator 94 also takes the estimated hitch angle rate $\dot{\gamma}$ as an input to determine if a steady state condition has been met by system 10 (during a steady-state input for curvature command $\kappa_2$). When a steady-state condition has been met, the compensator 94, as discussed above, takes the measured steering angle δ as another input and determines the error $e_{\delta,ss}$, the adaptation gain $k_{adapt}$, and the scale factor α, which is then applied to the commanded curvature $\kappa_2$ in the depicted closed-loop manner to arrive at the scaled curvature $\alpha\kappa_2$ as the input to curvature routine 98, which, as discussed above, works to reduce the error $e_{\delta,ss}$. In the particular variation of controller 28 shown in FIG. 11, the signal $\kappa_n$ is a signal representing the amount of knob rotation. It may or may not be directly proportional to knob angle. It is normalized so that a full clockwise rotation is represented by a value of 1, and a full counter-clockwise rotation is represented by a value of −1. The compensator 94 also takes the normalized knob signal $\kappa_n$ as an input to determine if the magnitude of the commanded curvature $\kappa_2$ is at or near the maximum curvature $\kappa_{max}$ and, using this determination, provides the adaptation gain only when the magnitude of the commanded curvature $\kappa_2$ is at or near the maximum curvature $\kappa_{max}$ (e.g., at the maximum curvature $\kappa_{max}$ or, in some variations within a predetermined limit such as within ten percent of the maximum curvature $\kappa_{max}$).

Figure 12:
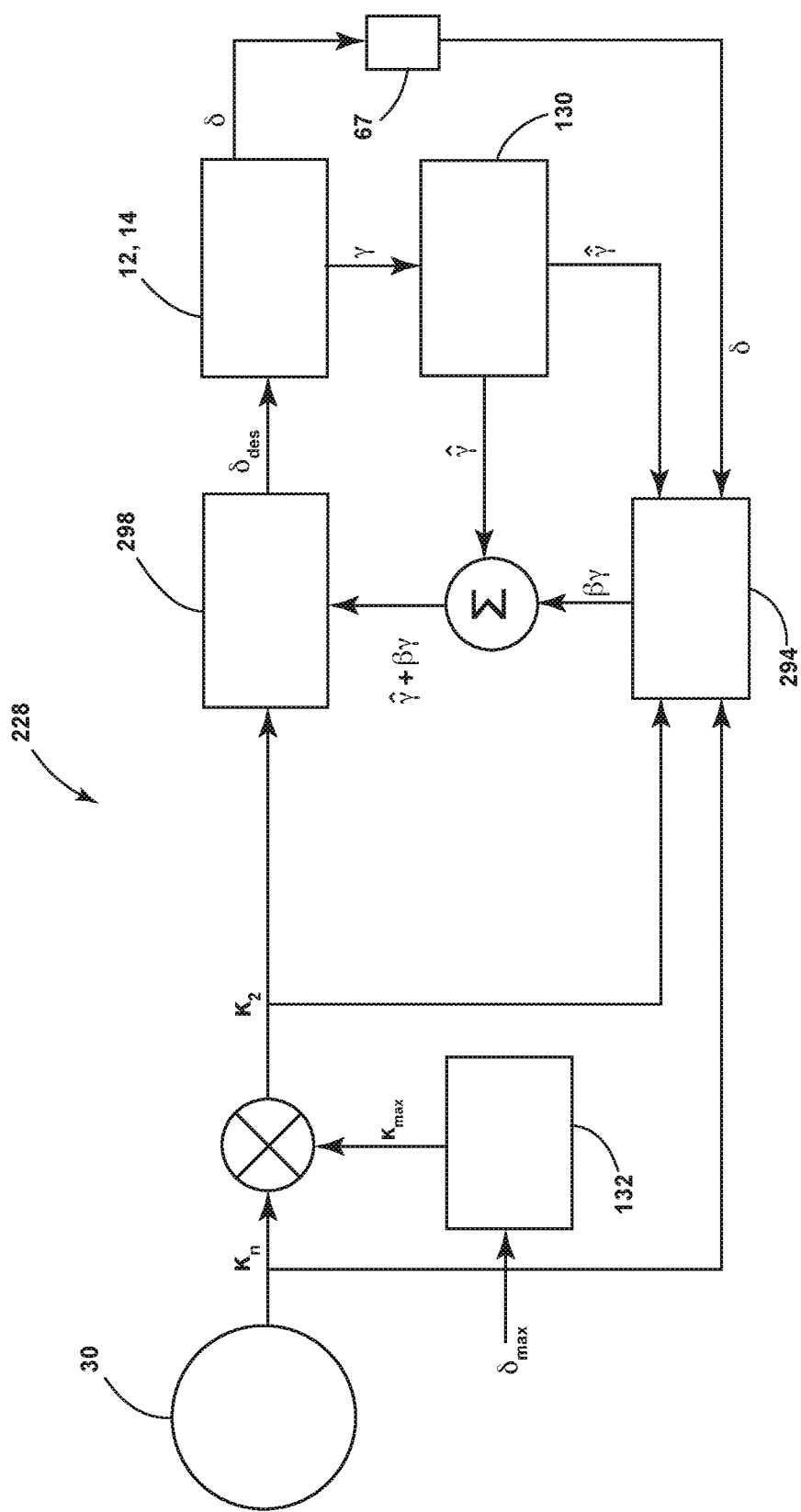
FIG. 12 is a schematic diagram of an alternative controller employing an alternative compensator to adjust to a control parameter to compensate for errors affecting the performance in returning the trailer to a zero hitch angle.

FIG. 12 shows one embodiment of a compensator 294 applied to a controller 228 in which the control parameter to be adapted is a hitch angle correction. The correction is added to a hitch angle measurement or estimate $\hat{\gamma}$ obtained by a hitch angle device that can either employ the hitch angle sensor 44 described above (or variations thereof) or a hitch angle estimation routine 130, such as the above-described scheme that uses sensed vehicle and trailer yaw rates $\omega_1, \omega_2$. In this manner, compensator 294 can improve performance when a factor contributing to a steady-state error is an unknown error in the hitch angle sensor 44 or estimation routine 130 (and related sensors 25, 60—FIG. 2). Even further, such a compensator 294 can also improve RTZ performance for other errors, such as in the entered or estimated kinematic parameters (including trailer length D and hitch position L).

Controller 228 hitch angle offset adaptation is carried out when the hitch angle γ is at or near steady-state by, again, providing the estimated hitch angle rate $\dot{\hat{\gamma}}$ as an input to compensator 294. In a similar manner to that which is discussed above, compensator 294 also takes the commanded curvature $\kappa_2$ as an input and, optionally, takes the normalized knob signal $\kappa_n$ as an input to limit adaptation gain to instances where the commanded curvature $\kappa_2$ is at or near the maximum curvature $\kappa_{max}$. Notably, however, the compensator 294 does not scale the curvature input, allowing the commanded curvature $\kappa_2$ to be continuously fed to curvature controller 228. The compensator 294 instead adapts the hitch angle γ, as illustrated, by using the steady state steering angle error $e_{\delta,ss}$ to add an offset $\beta_\gamma$ to the measured or estimated hitch angle $\hat{\gamma}$ before being fed into the curvature controller 228. In this manner, rather than replacing the commanded curvature $\kappa_2$ in the control law of equation (2) with the scaled commanded curvature $\alpha\kappa_2$, controller 228 replaces the estimated or measured hitch angle $\hat{\gamma}$ with the offset hitch angle $\hat{\gamma}+\beta_\gamma$ in the control law of equation (2).

In a similar manner to that which is discussed above, compensator 294 can include both the update law for the offset $\beta_\gamma$, as well as the function computing an adaptation gain for the offset $\beta_\gamma$ that is similar to the adaptation gain discussed above. In an alternative arrangement, the measured or estimated hitch angle $\hat{\gamma}$ can be replaced by a scaled hitch angle $\alpha\hat{\gamma}$ in a manner similar to the scaled commanded curvature $\alpha\kappa_2$, discussed above. In another variation, a controller can include multiple hitch angle offsets $\beta_{\gamma,k}$, k=1, . . . , N (wherein N represents the finite number of offsets), with each offset corresponding to one of a sequential range of nominal (i.e. measured or estimated) hitch angles $\hat{\gamma}$. The hitch angle correction applied at the particular measured or estimated hitch angle $\hat{\gamma}$ can, accordingly, be a combination of the hitch angle correction parameters, which may be additive or escalating in nature.

It is noted that both embodiments of the controllers 28,228 discussed above apply the described compensation at near steady state conditions (for at least hitch angle γ), which is at least partially done to help compensate for the performance characteristic error that may be at least partially due to an uncertainty in the hitch angle measurement. However, in various instances when the hitch angle rate measurement or estimate $\dot{\hat{\gamma}}$ is known or believed to be sufficiently accurate, a variation of the compensation scheme can be employed that allows parameter adaptation when the hitch angle γ is not at steady-state. Such a scheme requires a reference model that operates under dynamic conditions, an example of which is provided in the equation:

$$\dot{\gamma}_{pred} = \frac{v_1}{L}\frac{L\kappa_2 + D\kappa_2\cos\gamma - \sin\gamma}{D\kappa_2\sin\gamma + \cos\gamma}, \quad (10)$$

where $v_1$ is the vehicle velocity. Thus, a controller that uses a dynamic compensation scheme based around equation (10), the associated compensator will take an estimate or measurement of the actual hitch angle rate $\dot{\gamma}$ compared to the predicted hitch angle rate $\dot{\gamma}_{pred}$ derived using equation (10) with the commanded curvature $\kappa_2$ as an input to determine an error in the hitch angle rate $e_{\dot{\gamma}}$ according to:

$$e_{\dot{\gamma}} := \dot{\hat{\gamma}} - \dot{\gamma}_{pred}, \quad (11)$$

where $\dot{\hat{\gamma}}$ is the estimated hitch angle rate, as the adaptation law. It is contemplated that a measured hitch angle rate can also be used. The described compensation scheme and adaptation law can be implemented by a compensator similar to the compensator 94 described above in a controller similar to controller 28 described above with respect to FIG. 11, with the measured or estimated hitch angle rate $\dot{\hat{\gamma}}$ substituted for the steering angle δ as an input to the compensator 94.

The controllers 28,228 described above are example embodiments of controllers that can provide compensation to a control parameter based on an error between a predicted characteristic and a monitored characteristic, and are particularly adapted to the variation of system 10 described above using the curvature-based control scheme (i.e. using curvature routine 98 and the related equations). In other embodiments, different control parameters can be adjusted to similarly available characteristics that relate the control parameter to RTZ performance. In one such example a system that uses a desired, or commanded, hitch angle $\gamma_{des}$ as the control parameter, and the steering angle δ of the corresponding vehicle 14 to bring the measured (or estimated) hitch angle γ to the commanded hitch angle $\gamma_{des}$ can apply a scale factor α to the desired hitch angle $\gamma_{des}$ to be fed into the corresponding hitch angle control routine. Still further variations are contemplated in this manner that can compensate for errors in system performance characteristics to scale a control parameter according to similar principles without departing from the spirit of the present invention. It is also noted that adaptation, as described herein, can be applied to more than one control parameter. In one example, a controller can implement different scale factors for left and right curvature requests, as such a scheme may help compensate for errors that result in asymmetry in performance, such as an unknown hitch angle γ bias.

In a further embodiment, a method for assisting in reversing of a vehicle 14 and trailer 12 combination incorporates the use of the system 10 described above according to the above-described parameter compensation schemes and variations thereof. The method can generally involve outputting the steering signal (i.e., the desired steering angle $\delta_{des}$) based on the control parameter to the steering system 62 of the vehicle 14 in the vehicle 14 and trailer 12 combination to maintain the trailer 12 along the commanded backing path 26. The method further includes determining the error between the above-described measured behavior of the relevant characteristic of the vehicle 14 and trailer 12 combination and the predicted behavior of the characteristic, and adjusting the control parameter based on the error. This method can be carried out using the controllers 28,228 employing the compensators 94,294, as described above according to the schemes discussed in connection therewith and variations thereof. In particular embodiments, the control parameter can be the commanded curvature $\kappa_2$ of the vehicle 14 and trailer 12 combination or the measured or estimated hitch angle $\hat{\gamma}$ thereof, as discussed in greater detail above. Further, the error can be between a predicted steering angle $\delta_{pred}$ thereof and a measured steering angle δ or between a predicted hitch angle rate $\dot{\gamma}_{pred}$ and a measured or estimated hitch angle rate $\dot{\hat{\gamma}}$, among other possibilities as would be understood in light of the above description in light of any other particular aspects of the control scheme implemented.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in reversing of a vehicle-trailer combination, comprising:
   a vehicle steering system including steered vehicle wheels;
   a curvature input device outputting a commanded curvature of the vehicle-trailer combination based on a position of the device; and
   a controller:
      receiving the commanded curvature;
      outputting a steering signal based on the commanded curvature and at least one kinematic parameter of the vehicle-trailer combination to the steering system to converge the vehicle-trailer combination to a backing path having the commanded curvature;
      calculating a predicted steering angle for the steered vehicle wheels corresponding with the backing path having the commanded curvature;
      measuring an actual steering angle for the steered vehicle wheels;
      determining an error between the actual steering angle and the predicted steering angle; and
      scaling the commanded curvature based on the error to output a scaled curvature.

2. The system of claim 1, wherein scaling the commanded curvature based on the error compensates for an inaccuracy the at least one kinematic parameter.

3. The system of claim 2, wherein the predicted steering angle is further based on the at least one kinematic parameter.

4. The system of claim 2, wherein at least one of the kinematic parameters is a dimension within the vehicle-trailer model that is one of input by a user or estimated by the system.

5. The system of claim 1, wherein:
   the controller determines that the vehicle-trailer combination is in a steady-state condition before scaling the commanded curvature;
   the scaled curvature is subsequently used in outputting the steering signal; and
   scaling the commanded curvature based on the error converges the actual steering angle to the predicted steering angle.

6. The system of claim 1, wherein the controller scales the commanded curvature by a function of the error to converge the error to zero.

7. The system of claim 1, wherein:
   the steering signal is further output based on a measurement of a hitch angle between a vehicle and a trailer in the vehicle-trailer combination; and
   scaling the commanded curvature based on the error compensates for an inaccuracy of the measurement of the hitch angle.

8. A vehicle, comprising:
   a steering system including steered vehicle wheels;
   a curvature input device outputting a commanded curvature of the vehicle-trailer combination based on a position of the device; and
   a controller:
      receiving the commanded curvature;
      outputting a steering signal based on the commanded curvature and at least one kinematic parameter to the steering system to converge a combination of the vehicle and a trailer articulably coupled with the vehicle to a backing path having the commanded curvature;
      calculating a predicted hitch angle between the vehicle and the trailer corresponding with the backing path having the commanded curvature;
      measuring an actual hitch angle between the vehicle and the trailer;
      determining an error between the actual hitch angle and the predicted hitch angle; and
      scaling the commanded curvature based on the error to output a scaled curvature.

9. The vehicle of claim 8, wherein:
   the steering signal is further based on a plurality of kinematic parameters in a vehicle-trailer model; and
   scaling the commanded curvature based on the error compensates for an inaccuracy in one or more of the kinematic parameters.

10. The vehicle of claim 9, wherein the predicted hitch angle is further based on the plurality of kinematic parameters in the vehicle-trailer model.

11. The vehicle of claim 9, wherein at least one of the kinematic parameters is a dimension within the vehicle-trailer model that is one of input by a user or estimated by the system.

12. The vehicle of claim 8, wherein the controller scalies the commanded curvature by a function of the error to converge the error to zero.

13. A method for assisting in reversing of a vehicle-trailer combination, comprising:
   receiving an input of a commanded curvature of the vehicle-trailer combination from a curvature input device outputting the commanded curvature based on a position of the input device;
   outputting a steering signal based on the commanded curvature and at least one kinematic parameter of the vehicle-trailer combination to a steering system of a vehicle in the vehicle-trailer combination to converge the vehicle-trailer combination to a backing path having the commanded curvature;

calculating a predicted steering angle for steered wheels of the steering system corresponding with the backing path having the commanded curvature;

measuring an actual steering angle for the steered vehicle wheels;

determining an error between the actual steering angle and the predicted steering angle; and scaling the commanded curvature based on the error.

14. The method of claim 13, wherein the predicted steering angle is further based on at the least one kinematic parameter.

15. The method of claim 14, wherein at least one kinematic parameter is a dimension within the vehicle-trailer model that is one of input by a user or estimated by the system.

16. The method of claim 13, wherein the commanded curvature the commanded curvature is scaled by a function of the error and is subsequently used to output the steering signal to converge the error to zero.

* * * * *